(12) United States Patent
Pignataro et al.

(10) Patent No.: US 10,972,381 B2
(45) Date of Patent: Apr. 6, 2021

(54) NETWORK OPERATIONS REACTIVE TO OPERATIONS DATA INCLUDED IN SEAMLESS BIDIRECTIONAL FORWARDING DETECTION (S-BFD) PACKETS

(71) Applicant: Cisco Technology, Inc., San Jose, CA (US)

(72) Inventors: Carlos M. Pignataro, Cary, NC (US); Nagendra Kumar Nainar, Morrisville, NC (US); Reshad Rahman, Ottawa (CA); Frank Brockners, Cologne (DE); Shwetha Subray Bhandari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/392,299

(22) Filed: Apr. 23, 2019

(65) Prior Publication Data

US 2020/0344152 A1 Oct. 29, 2020

(51) Int. Cl.
*H04L 12/707* (2013.01)
*H04L 12/703* (2013.01)
(Continued)

(52) U.S. Cl.
CPC .......... *H04L 45/22* (2013.01); *H04L 41/5003* (2013.01); *H04L 41/5019* (2013.01); *H04L 45/28* (2013.01); *H04L 69/22* (2013.01)

(58) Field of Classification Search
CPC ..... H04L 45/22; H04L 69/22; H04L 41/5019; H04L 45/28; H04L 41/5003
See application file for complete search history.

(56) References Cited

U.S. PATENT DOCUMENTS 9,185,170 B1 * 11/2015 Grammel ............ H04L 43/0811
9,497,107 B1 * 11/2016 Akiya ..................... H04L 45/22
(Continued)

OTHER PUBLICATIONS

Brockners, et al, "NSH Encapsulation for In-situ OAM Data draft-brockners-sfc-ioann-nsh-01", Mar. 3, 2018, Barefoot Networks, IETF, p. 1-10 (Year: 2018).*

(Continued)

*Primary Examiner* — Ivan O Latorre
(74) *Attorney, Agent, or Firm* — The Law Office of Kirk D. Williams

(57) ABSTRACT

In one embodiment, in-band operations data (e.g., In-situ Operations, Administration, Maintenance and/or other operations data) is added to Seamless Bidirectional Forwarding (S-BFD) packets. In one embodiment, a S-BFD packet received by a node includes a BFD discriminator and operations data. Reactive processing is identified based on the BFD discriminator. The S-BFD packet and the operations data (e.g., in an operations data field in a header of the received S-BFD packet, in an IOAM Type-Length-Value (TLV), etc.) is processed according to the identified reactive function. Examples of these reactive actions include, but are not limited to, determining a result based on processing of said particular operations data by the local node or a remote analytics server, and sending a response packet including unprocessed and/or a result of the processed operations data (e.g., performance, loss, jitter, an indication of compliance with a service level agreement, and/or another data measurement or result).

20 Claims, 10 Drawing Sheets

(51) Int. Cl.
H04L 29/06 (2006.01)
H04L 12/24 (2006.01)

(56) References Cited

U.S. PATENT DOCUMENTS

| | | | | |
|---|---|---|---|---|
| 9,680,694 | B1* | 6/2017 | Kotrabasappa | H04L 45/66 |
| 10,623,278 | B2 | 4/2020 | Bhandari et al. | |
| 2014/0126354 | A1* | 5/2014 | Hui | H04L 45/28 |
| | | | | 370/225 |
| 2015/0124626 | A1* | 5/2015 | Sul | H04L 43/10 |
| | | | | 370/241.1 |
| 2016/0261474 | A1* | 9/2016 | Raghavan | H04L 43/10 |
| 2016/0315819 | A1 | 10/2016 | Dara et al. | |
| 2016/0315850 | A1 | 10/2016 | Dara et al. | |
| 2016/0315921 | A1 | 10/2016 | Dara et al. | |
| 2017/0339072 | A1 | 11/2017 | Pignataro et al. | |
| 2018/0331890 | A1* | 11/2018 | Song | H04L 12/56 |
| 2019/0036818 | A1* | 1/2019 | Nainar | H04L 69/325 |
| 2019/0296988 | A1 | 9/2019 | Bhandari et al. | |
| 2019/0297005 | A1* | 9/2019 | Pignataro | H04L 45/02 |

OTHER PUBLICATIONS

Deering et al., "Internet Protocol, Version 6 (IPv6) Specification," Dec. 1998, RFC 2460, The Internet Society, Reston, VA, USA (thirty-nine pages).
Deering et al., "Internet Protocol, Version 6 (IPv6) Specification," Jul. 2017, RFC 8200, The Internet Society, Reston, VA, USA (forty-two pages).
Carpenter et al., "Transmission and Processing of IPv6 Extension Headers," Dec. 2013, RFC 7045, The Internet Society, Reston, VA, USA (ten pages).
Elkins et al., "IPv6 Performance and Diagnostic Metrics (PDM) Destination Option," Sep. 2017, RFC 8250, The Internet Society, Reston, VA, USA (thirty pages).
Brockners et al., "Requirements for In-situ OAM," Mar. 13, 2017, draft-brockners-inband-oam-requirements-03, The Internet Society, Reston, VA, USA (twenty-four pages).
Brockners et al., "Data Fields for In-situ OAM," Jul. 2, 2017, draft-brockners-inband-oam-data-07, The Internet Society, Reston, VA, USA (twenty-nine pages).
Brockners et al., "Encapsulations for In-situ OAM Data," Jul. 2, 2017, draft-brockners-inband-oam-transport-05, The Internet Society, Reston, VA, USA (thirty pages).
Brockners et al., "Geneve encapsulation for In-situ OAM Data," Jun. 27, 2018, draft-brockners-ippm-ioam-geneve-01, The Internet Society, Reston, VA, USA (ten pages).
Brockners et al., "VXLAN-GPE Encapsulation for In-situ OAM Data," Jun. 27, 2018, draft-brockners-ippm-ioam-vxlan-gpe-01, The Internet Society, Reston, VA, USA (ten pages).
Brockners et al., "Data Fields for In-situ OAM," Oct. 30, 2017, draft-ietf-ippm-ioam-data-01, The Internet Society, Reston, VA, USA (twenty-nine pages).
Brockners et al., "Data Fields for In-situ OAM," Jun. 27, 2018, draft-ietf-ippm-ioam-data-03, The Internet Society, Reston, VA, USA (thirty-five pages).
Song and Zhou, "In-situ OAM Data Type Extension," Apr. 16, 2018, draft-song-ippm-ioam-data-extension-01, The Internet Society, Reston, VA, USA (seven pages).
Bhandari et al., "In-situ OAM IPv6 Options," Jun. 29, 2018, draft-ioametal-ippm-6man-ioam-ipv6-options-00, The Internet Society, Reston, VA, USA (nine pages).
Weis et al., "GRE Encapsulation for In-situ OAM Data," Mar. 3, 2018, draft-weis-ippm-ioam-gre-00, The Internet Society, Reston, VA, USA (nine pages).
Ali et al., "Operations, Administration, and Maintenance (OAM) in Segment Routing Networks with IPv6 Data plane (SRv6)," Jul. 2, 2018, draft-ali-spring-srv6-oam-01.txt, The Internet Society, Reston, VA, USA (twenty-eight pages).

Previdi et al., "IPv6 Segment Routing Header (SRH)," Mar. 13, 2017, draft-ietf-6man-segment-routing-header-06, The Internet Society, Reston, VA, USA (thirty-five pages).
Baker and Bonica, "IPv6 Hop-by-Hop Options Extension Header," Mar. 16, 2016, draft-ietf-6man-hbh-header-handling-03, The Internet Society, Reston, VA, USA (ten pages).
Filsfils et al., "IPv6 Segment Routing Header (SRH)," Jun. 28, 2018, draft-ietf-6man-segment-routing-header-14, The Internet Society, Reston, VA, USA (twenty-nine pages).
"In-band OAM for IPv6," IPv6 Network Management Configuration Guide, Cisco IOS Release 15M&T, Jan. 26, 2018, Cisco Systems, Inc., San Jose, CA (thirty-six pages).
IPv6 Network Management Configuration Guide, Cisco IOS Release 15M&T, Nov. 21, 2012, Cisco Systems, Inc., San Jose, CA (ninety-six pages).
"Encapsulation Techniques: Generic Network Virtualization Encapsulation, VXLAN Generic Protocol Extension, and Network Service Header," White Paper, 2014, Cisco Systems, Inc., San Jose, CA (three pages).
Tom Herbert, "Re: [nvo3] [ippm] [Int-area] encapsulation of IOAM data in various protocols—follow up from WG discussion in London," Apr. 12, 2018, www.mail-archive.com/nvo3@ietf.org/msg05579.html, The Internet Society, Reston, VA, USA (six pages).
Mahalingam et al., "Virtual eXtensible Local Area Network (VXLAN): A Framework for Overlaying Virtualized Layer 2 Networks over Layer 3 Networks," Aug. 2014, RFC 7348, The Internet Society, Reston, VA, USA (twenty-two pages).
Sajassi et al., "BGP MPLS-Based Ethernet VPN," Feb. 2015, RFC 7432, The Internet Society, Reston, VA, USA (fifty-six pages).
J. Touch, "Recommendations on Using Assigned Transport Port Numbers," Aug. 2015, RFC 7605, The Internet Society, Reston, VA, USA (twenty-four pages).
Maino et al., "Generic Protocol Extension for VXLAN," Apr. 30, 2018, draft-ietf-nvo3-vxlan-gpe-06, The Internet Society, Reston, VA, USA (seventeen pages).
"Cisco Data Center Spine-and-Leaf Architecture: Design Overview," White Paper, 2016, Cisco Systems, Inc., San Jose, CA (twenty-seven pages).
Halpern and Pignataro, "Service Function Chaining (SFC) Architecture," Oct. 2015, RFC 7665, The Internet Society, Reston, VA, USA (thirty-two pages).
Quinn et al., "Network Service Header (NSH)," Jan. 2018, Jan. 2018, RFC 8300, The Internet Society, Reston, VA, USA (forty pages).
Guichard et al., "NSH and Segment Routing Integration for Service Function Chaining (SFC)," Jun. 18, 2018, draft-guichard-sfc-nsh-sr-02, The Internet Society, Reston, VA, USA (fifteen pages).
Kumar et al., "Service Function Simple Offloads," Apr. 2, 2017, draft-ietf-sfc-offloads-00, The Internet Society, Reston, VA, USA (seventeen pages).
"Internet Protocol," Sep. 1981, RFC 791, The Internet Society, Reston, VA, USA (forty-five pages).
Farinacci et al., "Generic Routing Encapsulation (GRE)," Mar. 2000, RFC 2784, The Internet Society, Reston, VA, USA (nine pages).
Brockners et al., "Proof of Transit," Oct. 30, 2016, draft-brockners-proof-of-transit-02, The Internet Society, Reston, VA, USA (twenty-three pages).
Brockners et al., "Proof of Transit," May 7, 2018, draft-brockners-proof-of-transit-05, The Internet Society, Reston, VA, USA (twenty-three pages).
Brockners et al., "Proof of Transit," Oct. 1, 2018, draft-ietf-sfc-proof-of-transit-01, The Internet Society, Reston, VA, USA (twenty-five pages).
Katz and Ward, "Bidirectional Forwarding Detection (BFD)," Jun. 2010, RFC 5880, The Internet Society, Reston, VA, USA (forty-nine pages).
Pignataro et al., "Seamless Bidirectional Forwarding Detection (S-BFD)," Jul. 2016, RFC 7880, The Internet Society, Reston, VA, USA (twenty-four pages).
Pignataro et al., "Seamless Bidirectional Forwarding Detection (S-BFD) for IPv4, IPv6, and MPLS," Jul. 2016, RFC 7881, The Internet Society, Reston, VA, USA (eight pages).

(56) References Cited

OTHER PUBLICATIONS

Katz and Ward, "Bidirectional Forwarding Detection (BFD) for IPv4 and IPv6 (Single Hop)," Jun. 2010, RFC 5881, The Internet Society, Reston, VA, USA (seven pages).

Govindan and Pignataro, Seamless Bidirectional Forwarding Detection (S-BFD) for Virtual Circuit Connectivity Verification (VCCV), Jul. 2016, RFC 7885, The Internet Society, Reston, VA, USA (eleven pages).

Pignataro et al., "OSPF Extensions to Advertise Seamless Bidirectional Forwarding Detection (S-BFD) Target Discriminators" RFC 7884, The Internet Society, Reston, VA, USA (seven pages).

Ginsberg et al., "Advertising Seamless Bidirectional Forwarding Detection (S-BFD) Discriminators in IS-IS," Jul. 2016, RFC 7883, The Internet Society, Reston, VA, USA (five pages).

Aldrin et al., "Seamless Bidirectional Forwarding Detection (S-BED) Use Cases," Jul. 2016, RFC 7882, The Internet Society, Reston, VA, USA (fifteen pages).

Govindan and Pignataro, Advertising Seamless Bidirectional Forwarding Detection (S-BFD) Discriminators in the Layer Two Tunneling Protocol Version 3 (L2TPv3), Jul. 2016, RFC 7886, The Internet Society, Reston, VA, USA (six pages).

Brockners et al., "Data Fields for In-situ OAM," Oct. 20, 2018, draft-ietf-ippm-ioam-data-04, The Internet Society, Reston, VA, USA (thirty-nine pages).

Jethanandani et al., "Secure BFD Sequence Numbers," Feb. 19, 2019, draft-ietf-bfd-secure-sequence-numbers-03, The Internet Society, Reston, VA, USA (six pages).

Nadeau and Pignataro, "Bidirectional Forwarding Detection (BFD) for the Pseudowire Virtual Circuit Connectivity Verification (VCCV)," Jun. 2010, RFC 5885, The Internet Society, Reston, VA, USA (fourteen pages).

* cited by examiner

US 10,972,381 B2

NETWORK OPERATIONS REACTIVE TO OPERATIONS DATA INCLUDED IN SEAMLESS BIDIRECTIONAL FORWARDING DETECTION (S-BFD) PACKETS

TECHNICAL FIELD

The present disclosure relates generally to packet switching network communications, including, but not limited to, improved network operations reactive to operations data included in Seamless Bidirectional Forwarding (S-BFD) packets communicated among network nodes in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology in packet switching networks of various topologies.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
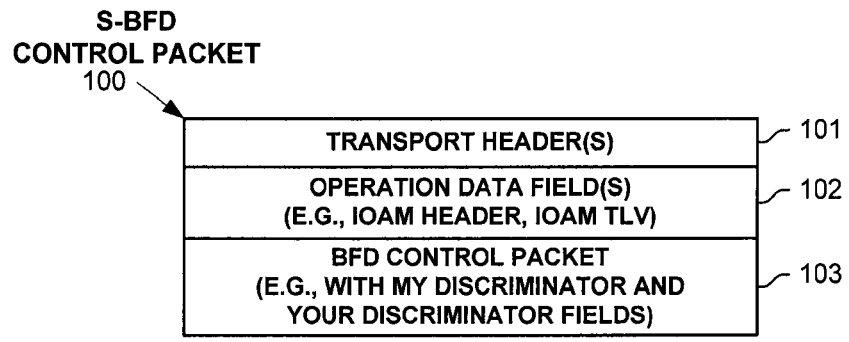
FIG. 1A illustrates a S-BFD packet according to one embodiment.

Disclosed are, inter alia, methods, apparatus, computer-storage media, mechanisms, and means associated with improved network operations reactive to Seamless Bidirectional Forwarding (S-BFD) packets, including based on operations data (e.g., In-situ Operations, Administration, Maintenance (IOAM) and/or other operations data) included therein.

One embodiment includes a method, comprising: receiving a particular Seamless Bidirectional Forwarding Detection (S-BFD) packet by a particular network node from another network node in a network, wherein the S-BFD packet includes a particular discriminator and particular operations data; and in response to identifying a particular reactive action of a plurality of different reactive actions based on the particular discriminator, the particular network node processing said particular S-BFD packet according to the particular reactive action; wherein each of the plurality of different reactive actions is identifiable based on a different discriminator value.

In one embodiment, said received S-BFD packet includes said particular operations data in an operations data field in a header of said received S-BFD packet. In one embodiment, said particular operations data is stored in an In-situ Operations, Administration, Maintenance (IOAM) Type-Length-Value (TLV) and/or IOAM header. In one embodiment, the particular reactive action includes: determining a result based on processing of said particular operations data, and the particular network node sending into the network a response packet including the result (e.g., collected and/or processed performance and/or measurement data, compliance with a service level agreement (SLA)). In one embodiment, this result is determined by the particular network node. In one embodiment, this result is determined by a remote analytics node.

One embodiment includes a method, comprising: receiving a particular Seamless Bidirectional Forwarding Detection (S-BFD) Control packet by a particular network node in a network with the S-BFD packet being originated by an initiator network node, wherein the particular S-BFD packet includes a particular BFD Control packet, and includes particular operations data in a particular In-situ Operations, Administration, Maintenance (IOAM) field in a header of the particular S-BFD packet, with the particular BFD Control packet including a particular discriminator in the Your Discriminator field and an initiator discriminator in the My Discriminator field. In response to identifying a particular reactive action of a plurality of different reactive actions based on the particular discriminator, the particular network node operations processing said particular S-BFD packet according to the particular reactive action; wherein each of the plurality of different reactive actions is identifiable based on a different discriminator value. In one embodiment, said operations processing said particular S-BFD packet includes sending a specific S-BFD Control packet to the initiator network node, wherein the specific S-BFD packet includes a specific BFD Control packet and includes a specific IOAM data field in a header of the specific S-BFD packet, with the specific BFD Control packet including the initiator discriminator in the Your Discriminator field and the particular discriminator in the My Discriminator field.

In one embodiment, said operations processing said particular S-BFD packet includes performing network analytics processing based on said particular operations data generating a result and including said result in the specific IOAM data field. In one embodiment, said operations processing said particular S-BFD packet includes: communicating said particular operations data to an analytics server, receiving a result from the analytics server, and including said result in the specific IOAM data field. In one embodiment, said operations processing said particular S-BFD packet includes sending a second S-BFD Control packet to the initiator network node, with the second S-BFD Control packet including an indication that operations processing is being performed. In one embodiment, said operations processing said particular S-BFD packet includes populating a specific IOAM TLV in the specific IOAM data field with said particular operations data.

2. Example Embodiments

Disclosed are, inter alia, methods, apparatus, computer-storage media, mechanisms, and means associated with improved network operations reactive to Seamless Bidirectional Forwarding (S-BFD) or other types of probe packets, including based on operations data (e.g., IOAM and/or other operations data) included therein.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processing elements, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

As used herein, a "data packet" refers to a standard packet communicating information (e.g., a customer data packet), while a probe packet (e.g., an out-of-band test or measurement packet) not being included in the definition of a data packet. S-BFD and BFD are probe/test packets, not data packets.

As used herein, "operations data" refers to operations, administration, maintenance (OAM) and/or provisioning (OAM-P) information (e.g., including operational and telemetry information), such as, but not limited to, in-band OAM data, or more specifically, In-Situ OAM (IOAM) data. In one embodiment, the operations data is raw data, processed data, and/or data resulting from processing of other information.

In one embodiment, the operations data is related to data-plane and/or control-plane processing in the network (e.g., in a portion of, or the entire network). In one embodiment, the operations data is related to communication (including, but not limited to, verifying and/or discovering a path taken and/or performance measurement data or results such as compliance with one or more service level agreement requirements) and/or other processing of packet(s) in a network. In one embodiment, the operations data is related to process(es), hardware, link(s), and/or other resources of one or more elements in the network (e.g., node(s), router(s), packet switching device(s), network management or other control system(s), host(s), server(s), apparatus, application processor(s), service devices(s), application processor(s), transmission and/or communications equipment). In one embodiment, operations data includes information related to the communication of a packet through a network, other protocol layer processing, and/or same layer processing.

In one embodiment, the operations data encompasses data related to one or more underlay protocols/networks. In one embodiment, the operations data encompasses data related to one or more overlay protocols/networks.

In one embodiment, operations data is added to an operations data field associated with a different protocol than the protocol currently being processed on the packet. The node processing the packet may not be configured to, or may not even be capable of, processing of the protocol of which the operations data field is being updated.

In one embodiment, the operations data field is an IOAM data field. As IOAM data fields may be associated with an extensible number of protocol headers, often the protocol processing of a packet includes the capability of updating an IOAM data field. One embodiment leverages this capability by updating an IOAM data field, but at a position of an IOAM data field associated with a different protocol header.

IOAM provides for including specific operation and telemetry information into data packets (i.e., in-band OAM) while the data packets traverse a path between two points in the network. Typically, probe packets, such as S-BFD packets are, out-of-band OAM packets used to measure and convey OAM-related information. In other words, IOAM is intended to be added to data packets, not probe packets.

However, one embodiment improves network operations by adding in-band OAM information (e.g., IOAM data) to these S-BFD Control/probe packets; and by using the lightweight reflector mechanisms associated with S-BFD Control/probe packets in collecting, distributing, communicating, processing operations data (e.g., IOAM data added to IOAM data fields and/or IOAM TLV's), and/or initiating a network reaction to the native or processed operations data (e.g., modifying a configuration of one or more network nodes to adjust/improve the operation of the network or a component thereof).

Each of FIGS. 1A-E is intended to illustrate one embodiment, of an expansive number of embodiments, of a S-BFD Control packet including operations data (e.g., in an IOAM header, IOAM TLV, and/or operations field in a header of the S-BFD Control packet). In one embodiment, a S-BFD Control packet uses a specific UDP port of 7784 defined for use by with IPv4, IPv6, and MPLS. However, one embodiment uses another mechanism to identify to a receiving node that the packet is a S-BFD Control packet.

FIG. 1A illustrates S-BFD Control packet 100 according to one embodiment. As shown, S-BFD Control packet 100 includes one or more transport headers 101, operations data field(s) (e.g., IOAM header, IOAM TLV) 102, and a BFD Control packet 103 (e.g., containing My Discriminator and Your Discriminator fields/values).

Figure 1B:
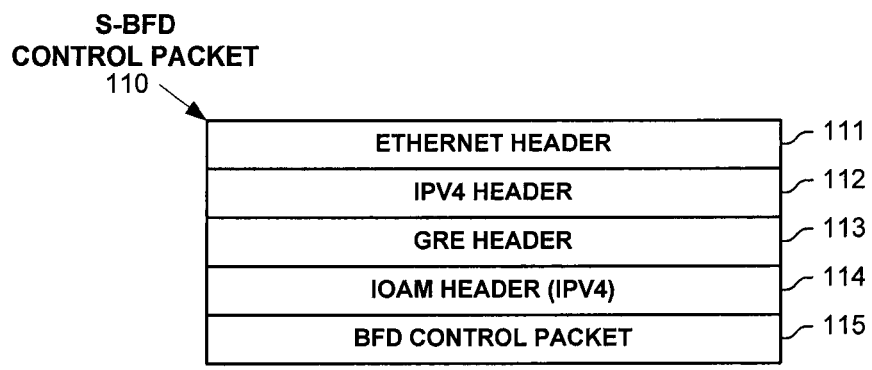
FIG. 1B illustrates a S-BFD packet according to one embodiment.

FIG. 1B illustrates S-BFD Control packet 110 according to one embodiment. As shown, S-BFD Control packet 110 includes Ethernet header 111, IPv4 header 112, GRE header 113, IOAM header 114 associated with IPv4 header 112 (and IPv4 protocol processing), and BFD Control packet 115. In one embodiment, operations data is updated in IOAM header 114 during Ethernet and/or other protocol-layer processing.

Figure 1C:
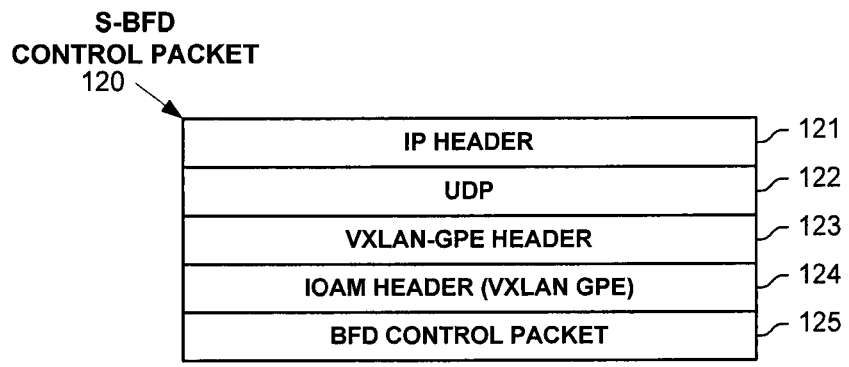
FIG. 1C illustrates a S-BFD packet according to one embodiment.

FIG. 1C illustrates S-BFD Control packet 120 according to one embodiment. As shown, S-BFD Control packet 120 includes IP header 121, UDP header 122, VxLAN-GPE header 123, IOAM header 124 associated with VxLAN-GPE header 123, and BFD Control packet 125. In one embodiment, operations data is updated in IOAM header 124 during IP or other protocol-layer processing.

Figure 1D:
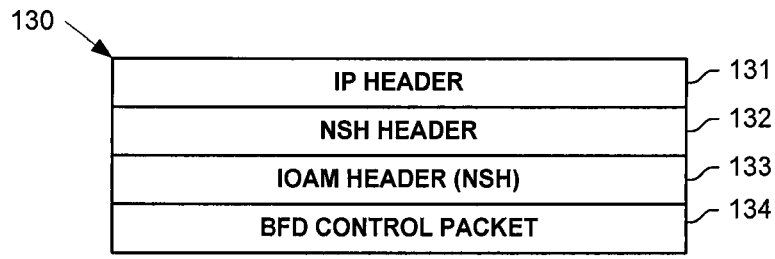
FIG. 1D illustrates a S-BFD packet according to one embodiment.

FIG. 1D illustrates S-BFD Control packet 130 according to one embodiment. As shown, S-BFD Control packet 130 includes IP header 131, Network Service Header (NSH) header 132, IOAM header 133 associated with NSH 132, and BFD Control packet 134. In one embodiment, operations data is updated in IOAM header 133 during IP and/or other protocol-layer processing.

Figure 1E:
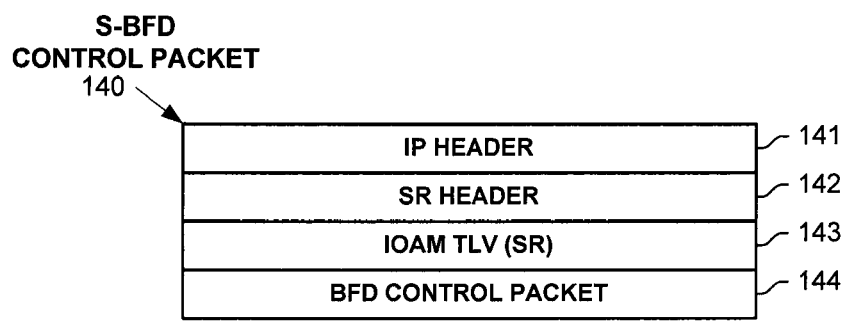
FIG. 1E illustrates a S-BFD packet according to one embodiment.

FIG. 1E illustrates S-BFD Control packet 140 according to one embodiment. As shown, S-BFD Control packet 140 includes IP header 141, SR header (SRH) 142, IOAM TLV 143 associated with SRH 142, and BFD Control packet 144. In one embodiment, operations data is updated in IOAM TLV 143 during IP and/or other protocol-layer processing.

Figure 2A:
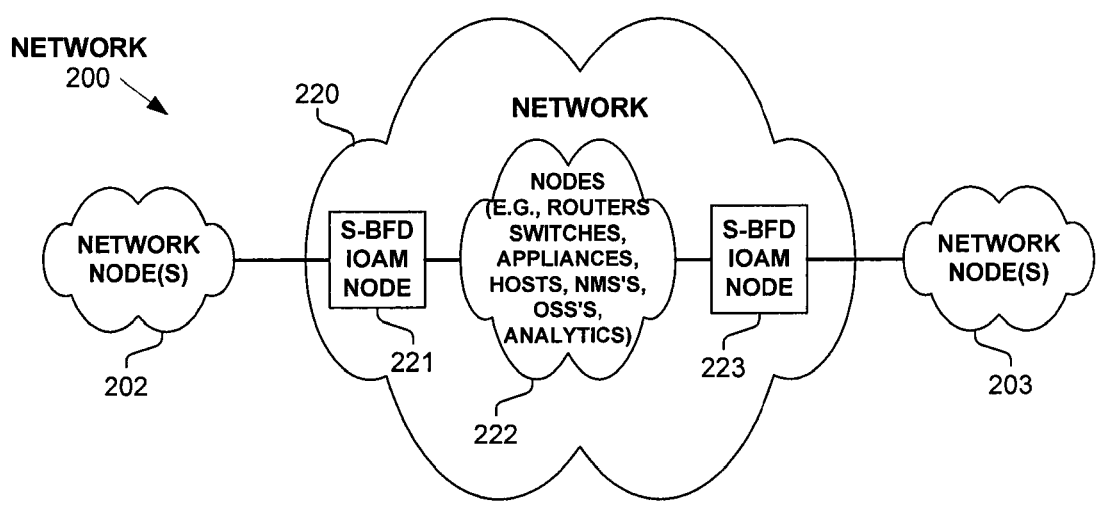
FIG. 2A illustrates a network operating according to one embodiment.

FIG. 2A illustrates a network 200 operating according to one embodiment. As shown, network 200 includes network node(s) 202 and 203 communicatively coupled via network 220 (e.g., a provider network). As shown, network 220 includes nodes 221 and 223 that perform S-BFD and IOAM processing, as well as network nodes 222 that include nodes that perform various functions, such as, but not limited to, routing, forwarding, S-BFD, IOAM, network management, operations support systems, and/or analytics servers. In one embodiment, network 200 uses Segment Routing (SR), Multiprotocol Label Switching (MPLS), tunnels, Ethernet VPN (EVPN), Provider Backbone Bridging EVPN (PBB-EVPN), Virtual eXtensible Local Area Network (VxLAN), Virtual eXtensible Local Area Network Generic Protocol Extension (VxLAN-GPE), Generic Routing Encapsulation, Internet Protocol version 4 and/or 6 (IP), and/or other encapsulating and/or packet forwarding/communicating technologies.

Figure 2B:
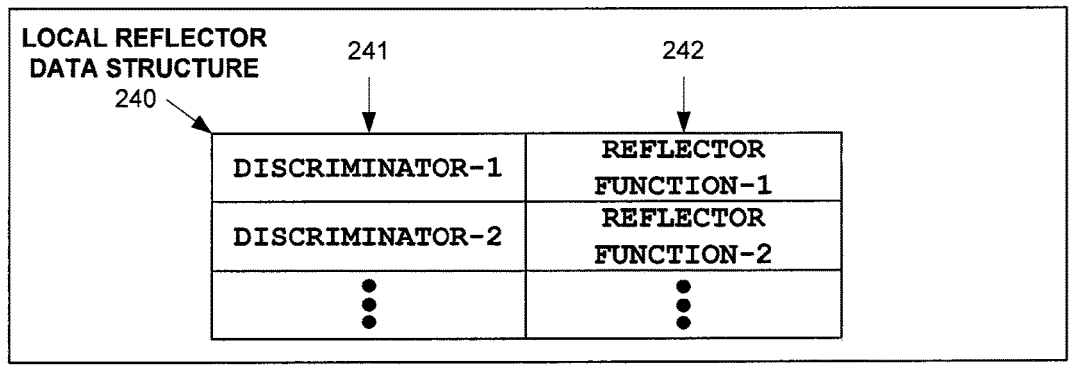
FIG. 2B illustrates a local reflector data structure according to one embodiment.

In one embodiment and with reference to FIG. 2B, each network node that performs S-BFD Reflector functionality will use at least one, but typically multiple BFD Discriminators in conjunction with in-band operations data processing, to cause desired, corresponding reflector function processing based on a Discriminator in a Your Discriminator field of the BFD packet encapsulated in a received S-BFD Control packet. Local reflector data structure 240 is used in one embodiment to map values of local BFD Discriminators 241 to the local reflector functions 242. In one embodiment, one or more reflector processes are used, with each implementing one or more reflective functions.

Figure 2C:
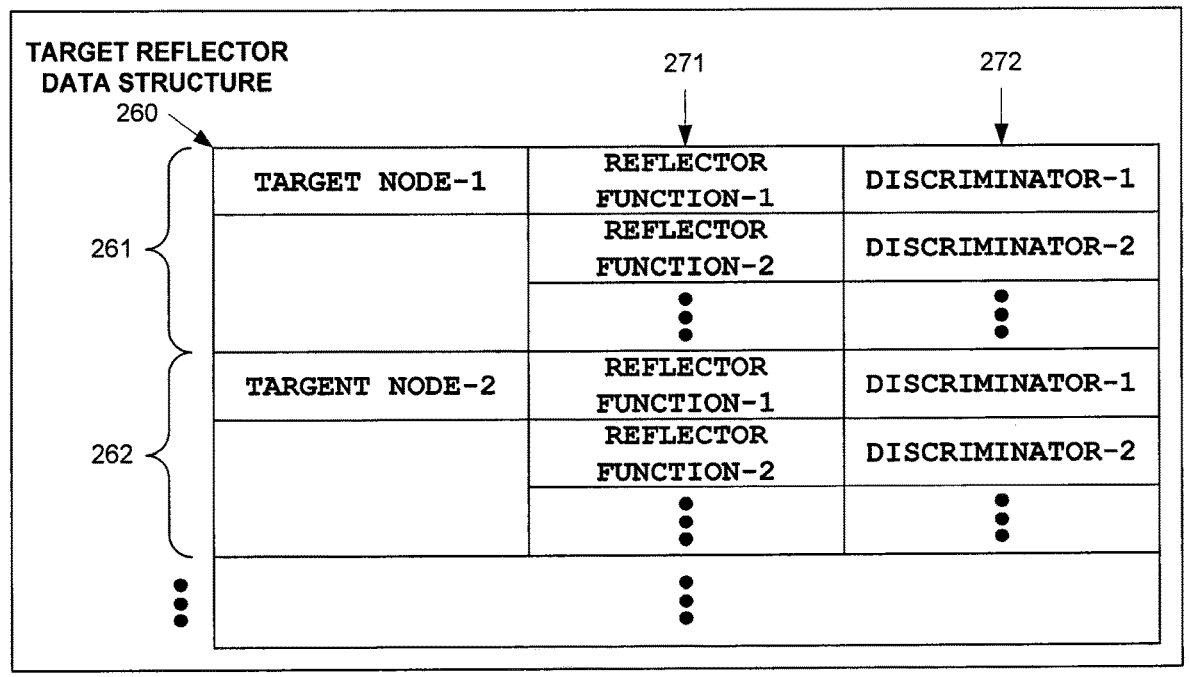
FIG. 2C illustrates a target reflector data structure according to one embodiment.

In one embodiment and with reference to FIG. 2C, each network node that will perform S-BFD Initiator functionality will use at least one, but typically multiple BFD Discriminators in conjunction with in-band operations data processing, to cause desired, corresponding reflector function processing based on a Discriminator in a Your Discriminator field of the BFD packet encapsulated in a S-BFD Control packet received by a different network node. Target reflector data structure 260 is used in one embodiment to map values of a reflector function (271) to the value of the corresponding BFD Discriminator (272) for each target network node (261, 262).

Figure 2D:
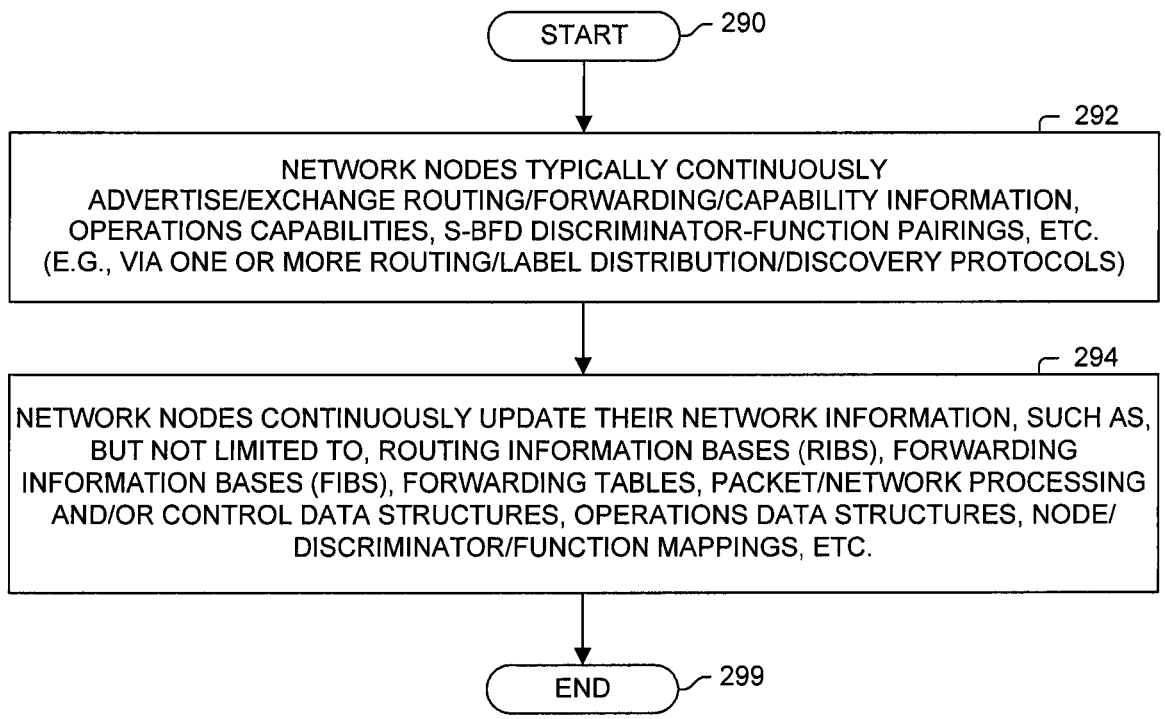
FIG. 2D illustrates a process according to one embodiment.

FIG. 2D illustrates a process according to one embodiment associated with improved network operations reactive to Seamless Bidirectional Forwarding (S-BFD) packets, including based on operations data (e.g., IOAM and/or other operations data) included therein. Processing begins with process block 290. In process block 292, network nodes in the networks typically continuously advertise/exchange routing, forwarding, capability and information (e.g., including operations capabilities, BFD Discriminator-functionality mappings), etc., via one or more routing, label distribution, discovery, signaling and/or other control-plane protocols. In process block 294, the network nodes continuously update their network information, such as, but not limited to, Routing Information Bases (RIBs), Forwarding Information Bases (FIBS), forwarding tables, packet/network processing and/or control data structures, operations data structures, local and target reflective data structures, etc. Processing of the flow diagram of FIG. 2D is complete as indicated by process block 299.

Figure 3A:
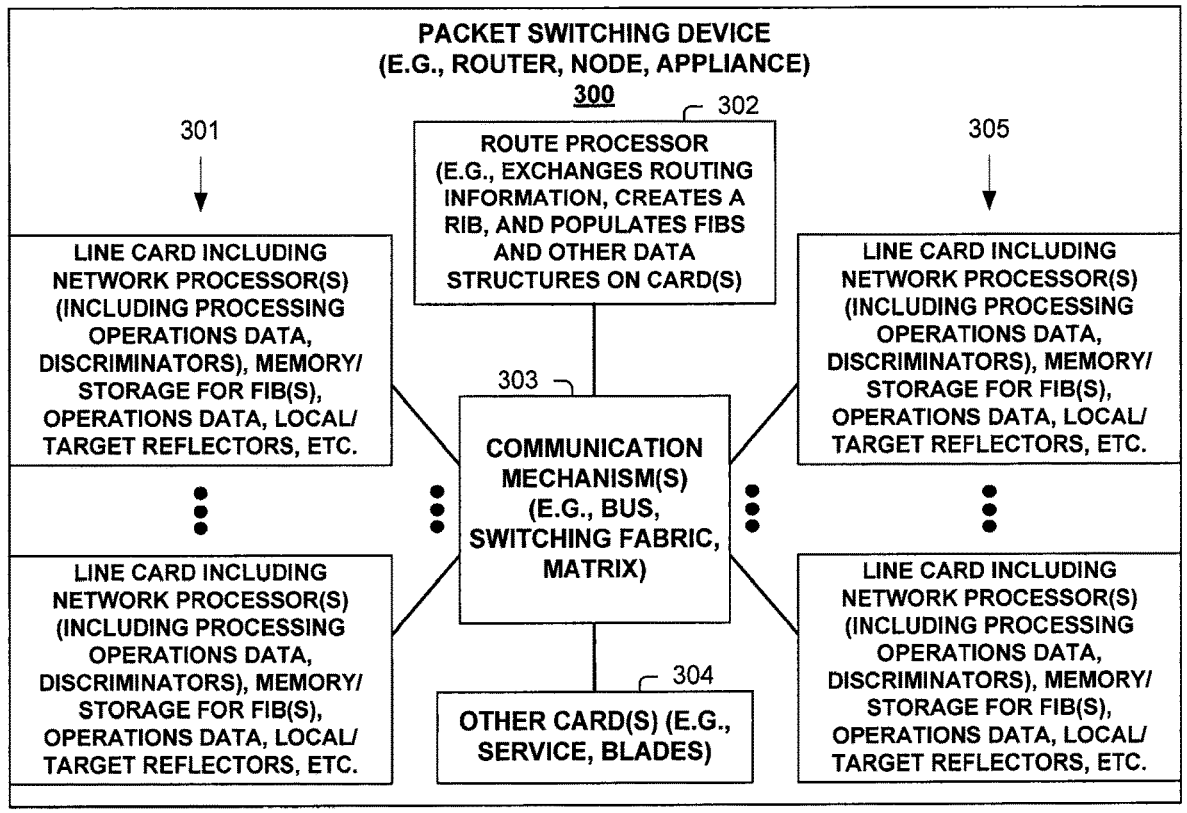
FIG. 3A illustrates a packet switching device according to one embodiment.
Figure 3B:
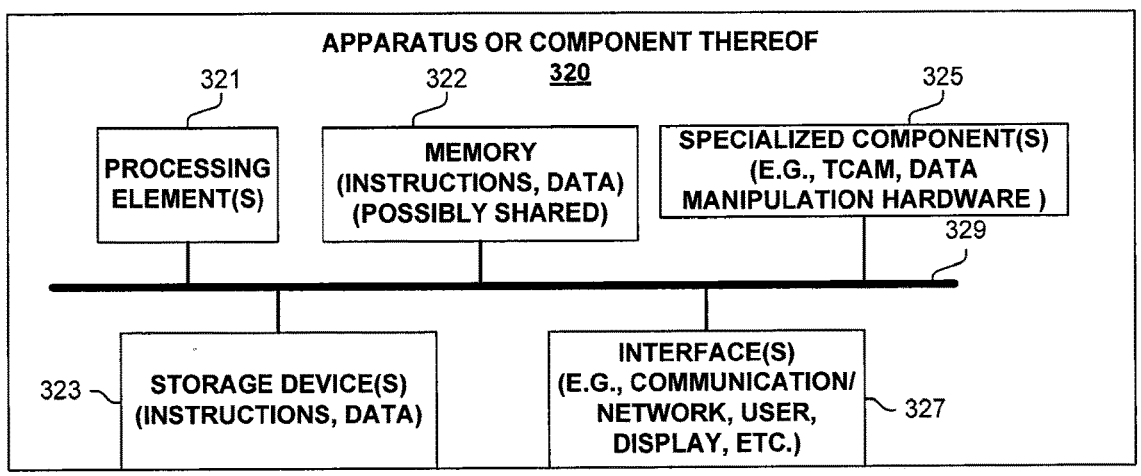
FIG. 3B illustrates an apparatus or component thereof according to one embodiment.

FIGS. 3A-B and their discussion herein provide a description of various network nodes, each operating according to one embodiment.

FIG. 3A illustrates one embodiment of a packet switching device 300 (e.g., router, node, switching, appliance, gateway) according to one embodiment. As shown, packet switching device 300 includes multiple line cards 301 and 305, each with one or more network interfaces for sending and receiving packets over communications links (e.g., possibly part of a link aggregation group), and with one or more processing elements that are used in one embodiment associated with improved network operations reactive to Seamless Bidirectional Forwarding (S-BFD) packets, including based on operations data (e.g., IOAM and/or other operations data) included therein. Packet switching device 300 also has a control plane with one or more processing elements (e.g., Route Processor(s)) 302 for managing the control plane and/or control plane processing of packets associated with improved network operations reactive to Seamless Bidirectional Forwarding (S-BFD) packets, including based on operations data (e.g., IOAM and/or other operations data) included therein. Packet switching device 300 also includes other cards 304 (e.g., service cards, blades) which include processing elements that are used in one embodiment to process (e.g., forward/send, drop, manipulate, change, modify, receive, create, duplicate, perform operations data processing functionality, apply a service according to one or more S-BFD reflector functions) packets associated with improved network operations reactive to Seamless Bidirectional Forwarding (S-BFD) packets, including based on operations data (e.g., IOAM and/or other operations data) included therein, and some hardware-based communication mechanism 303 (e.g., bus, switching fabric, and/or matrix, etc.) for allowing its different entities 301, 302, 304 and 305 to communicate. Line cards 301 and 305 typically perform the actions of being both an ingress and egress line card, in regards to multiple other particular packets and/or packet streams being received by, or sent from, packet switching device 300. In one embodiment, operations data processing and storage functions are implemented on line cards 301, 305.

FIG. 3B is a block diagram of an apparatus 320 (e.g., host, router, node, destination, or portion thereof) used in one embodiment associated with improved network operations reactive to Seamless Bidirectional Forwarding (S-BFD) packets, including based on operations data (e.g., IOAM and/or other operations data) included therein. In one embodiment, apparatus 320 performs one or more processes, or portions thereof, corresponding to one of the flow diagrams illustrated or otherwise described herein, and/or illustrated in another diagram or otherwise described herein.

In one embodiment, apparatus 320 includes one or more processor(s) 321 (typically with on-chip memory), memory 322 (possibly shared memory), storage device(s) 323, specialized component(s) 325 (e.g. optimized hardware such as for performing lookup, packet processing (e.g., including S-BFD reflector functionality and operations data processing); associative memory; binary and/or ternary content-addressable memory; Application Specific Integrated Circuit(s), cryptographic hash hardware, etc.), and interface(s) 327 for communicating information (e.g., sending and receiving packets, user-interfaces, displaying information, etc.), which are typically communicatively coupled via one or more communications mechanisms 329 (e.g., bus, links, switching fabric, matrix), with the communications paths typically tailored to meet the needs of a particular application.

Various embodiments of apparatus 320 may include more or fewer elements. The operation of apparatus 320 is typically controlled by processor(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processor(s) 321 and/or data which is manipulated by processor(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processor(s) 321 and/or data which is manipulated by processor(s) 321 for implementing functionality in accordance with an embodiment.

Figure 4A:
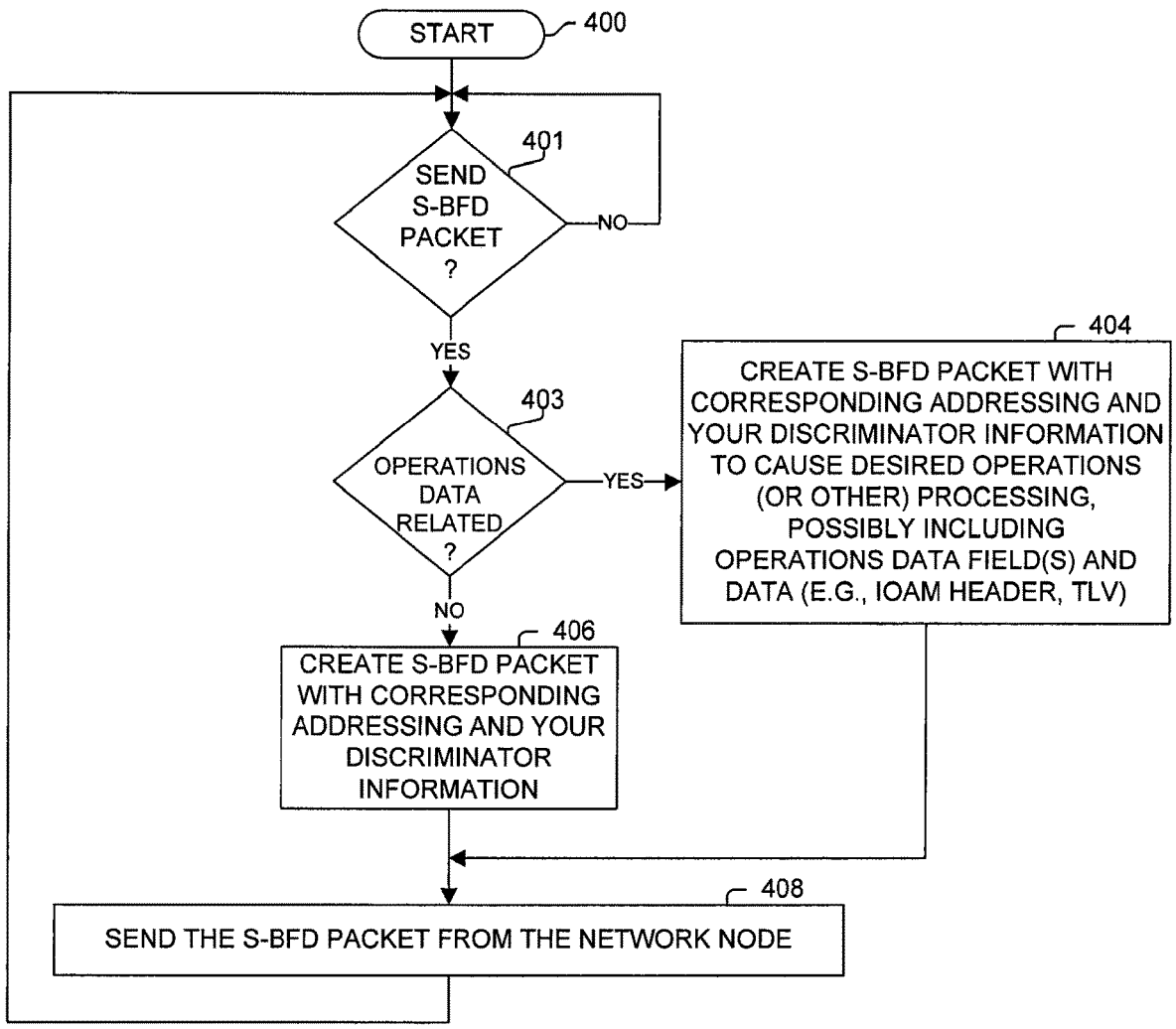
FIG. 4A illustrates a process operating according to one embodiment.

FIG. 4A illustrates a process operating according to one embodiment. Processing begins with process block 400. Processing remains at process block 401 until the network node determines it is time to send a S-BFD Control packet (e.g., periodically, reactive to some event), and then processing proceeds to process block 403.

One embodiment regularly sends out a standard S-BFD Control packet, and at a lower frequency, a S-BFD Control packet instrumented to collect, and possibly process, in-band operations data added to S-BFD Control packets (and possibly other collected or measured operations data). As determined in process block 403, if operations data is to be collected and/or processed, then processing proceeds to process block 404; otherwise processing proceeds to process block 406.

Continuing with process block 404, a S-BFD Control packet is created with corresponding addressing to reach its target reflective network node and with Your Discriminator and My Discriminator information in a BFD packet encapsulated therein. The Your Discriminator is selected (e.g., from multiple values such as shown in FIG. 2C) to cause desired reflective functionality to be performed. In one embodiment, the S-BFD Control packet includes pre-allocated operations data field(s) for insertion of in-band operations data as the S-BFD Control packet traverses the network. Processing proceeds to process block 408.

Continuing with process block 406, a S-BFD Control packet is created with corresponding addressing to reach its target reflective network node and with Your Discriminator and My Discriminator information in a BFD packet encapsulated therein. The Your Discriminator is selected (e.g., from multiple values such as shown in FIG. 2C) to cause desired reflective functionality to be performed. Processing proceeds to process block 408.

In process block 408, the S-BFD Control packet is sent from the network node; and processing returns to process block 401.

Figure 4B:
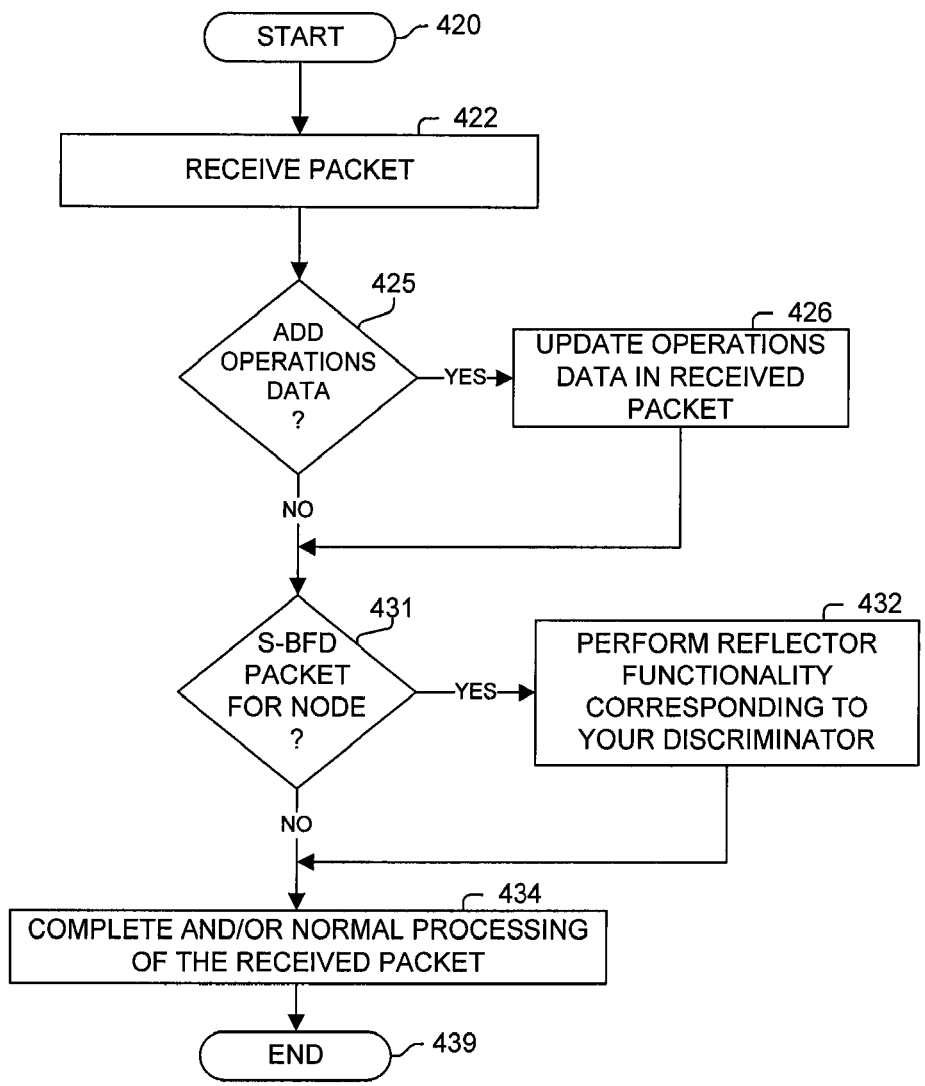
FIG. 4B illustrates a process operating according to one embodiment.

FIG. 4B illustrates a process operating according to one embodiment by a network node receiving a packet. Processing begins with process block 420. In process block 422, a packet is received by the network node. As determined in process block 425, if operations data is to be added to the packet, processing proceeds to process block 426; otherwise, processing proceeds directly to process block 431.

Continuing with process block 426, in-band operations data is added to the received packet (e.g., in an IOAM field or TLV), typically during the protocol processing at one or more protocol layers (e.g., according to IOAM procedures). Processing proceeds to process block 431.

As determined in process block 431, if the received packet is a S-BFD Control packet for the node (e.g., addressed for the node, has a proper Your Discriminator in the encapsulated BFD packet), then processing proceeds to process block 432; otherwise, processing proceeds directly to process block 434.

Continuing with process block 432, the reflector functionality corresponding to the Your Discriminator (and possibly based on My Discriminator such as when received by the S-BFD Initiator node for identifying the requested Reflector processing) is performed (e.g., operations data processing and/or distribution such as described herein). In one embodiment, different My Discriminators are used by the S-BFD Initiator node for readily identifying the processing requested of the Reflector node. Processing proceeds to process block 434.

Continuing with process block 434, processing of the received packet is continued/performed. Processing of the flow diagram of FIG. 4B is complete as indicated by process block 439.

FIGS. 5A-E and their discussion herein provide a description of the operation of various network nodes of network 500, with each node typically operating according to one embodiment.

Figure 5A:
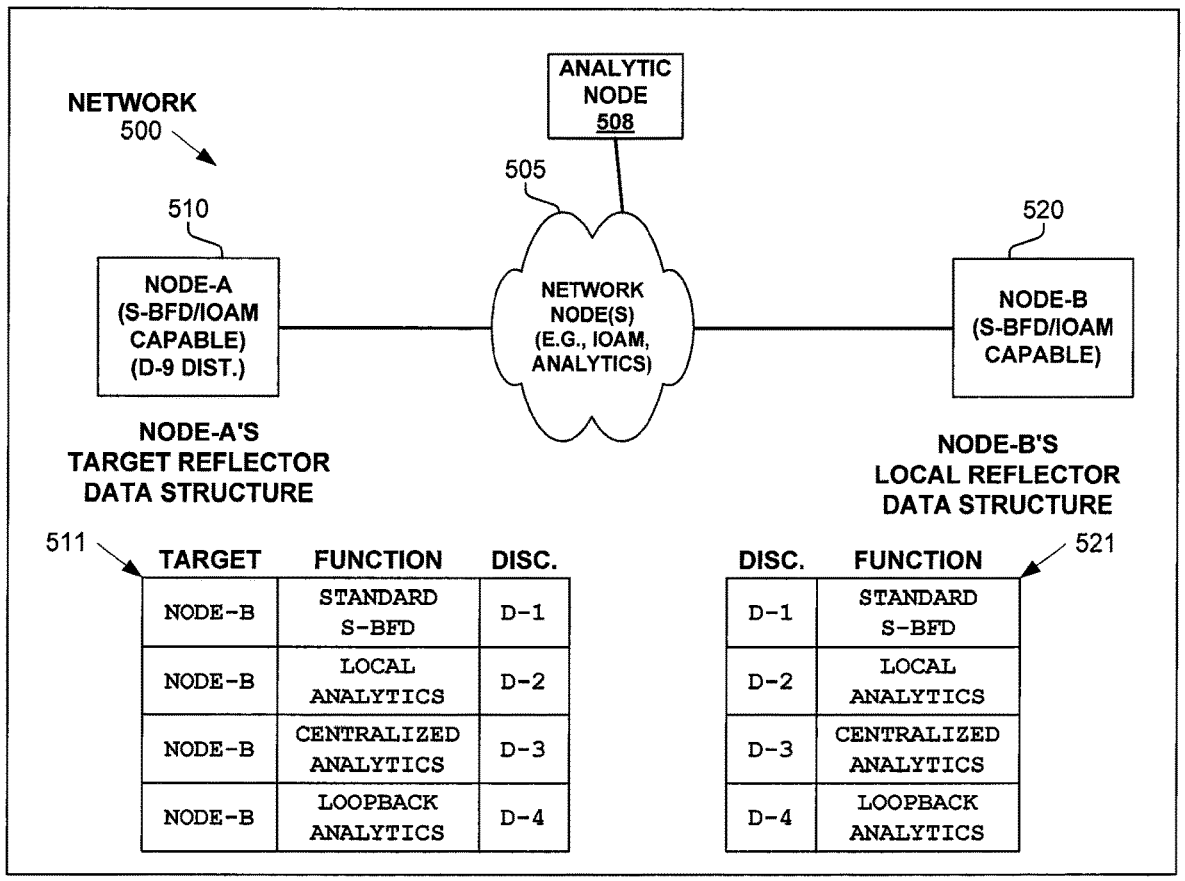
FIG. 5A illustrates a network operating according to one embodiment.

FIG. 5A illustrates network 500 operating according to one embodiment. As shown, network 500 includes a network Node-A 510 (with associated discriminator D-9), network 505 of one or more network nodes, network Node-B 520 (with associated discriminators D-1, D-2, D-3, and D-4), and analytic node 508.

In one embodiment, network Node-A 510 includes a target reflector data structure 511 that is populated as illustrated, with four different discriminators to correspondingly request performance of four different reflective functions on target Node-B 520. Symmetrically, Network Node-B 520 includes a local reflector data structure 521 that is populated as illustrated, with four different discriminators to cause desired processing according to the corresponding one of the four different reflective functions.

Figure 5B:
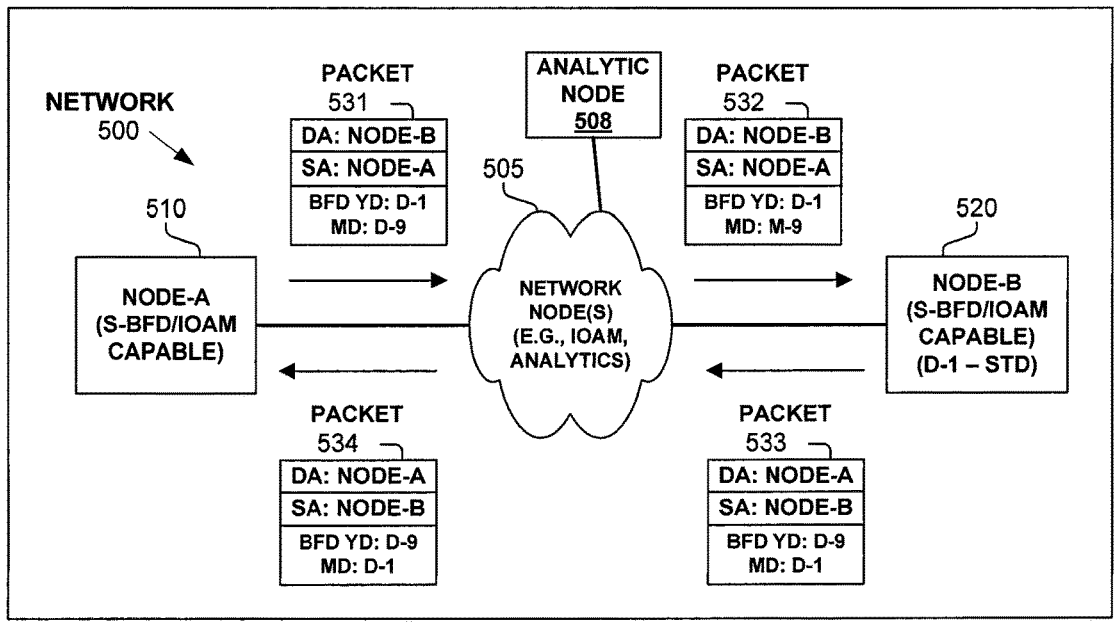
FIG. 5B illustrates a network operating according to one embodiment.

FIG. 5B illustrates network 500 operating according to one embodiment. As shown, initiator Node-A 510 creates and sends S-BFD Control packet 531 to reflective Node-B 520, using a Your Discriminator of D-1. Node B-520 receives S-BFD Control packet 532 (same packet as 531). In response and based on a Your Discriminator of D-1, reflective Node-B 520 creates and sends responsive BFD Control packet 533 towards Node-A 510. Initiator Node-A 510 receives and processes the reply BFD Control packet 534 (same packet as 533).

Figure 5C:
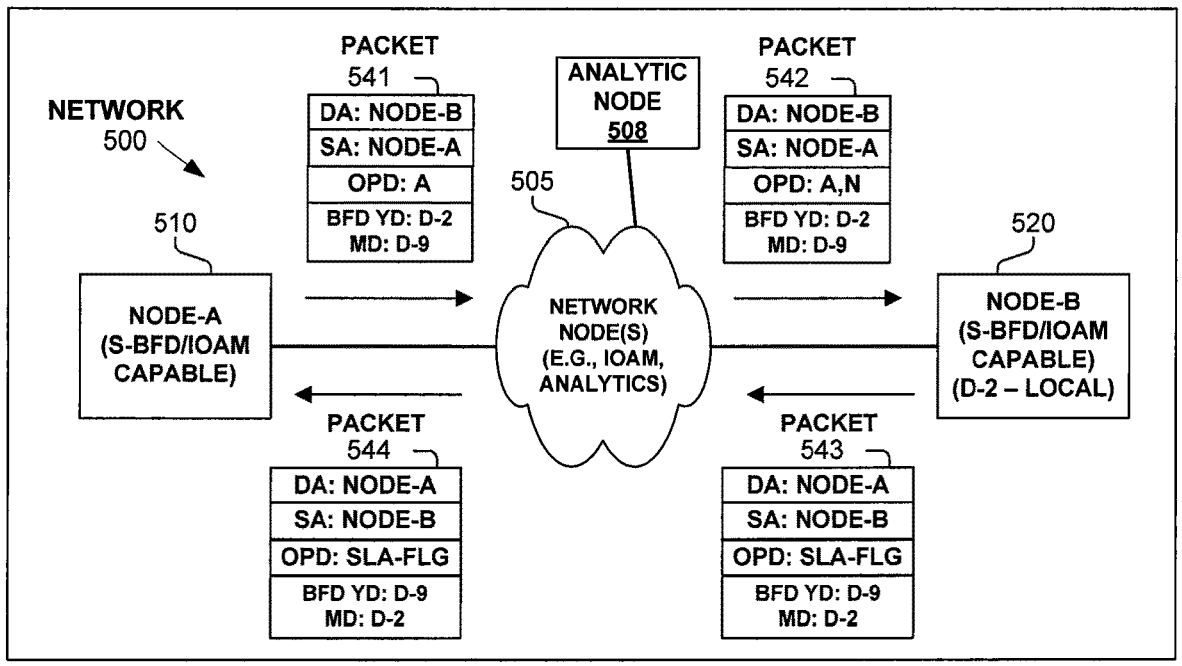
FIG. 5C illustrates a network operating according to one embodiment.

FIG. 5C illustrates network 500 operating according to one embodiment. As shown, initiator Node-A 510 creates S-BFD Control packet 541 that includes an operations data field and/or header that includes operations data (e.g., node identification, timestamp, and/or other operations data) labeled "A" related to Node-A 510. Packet 541, with Your Discriminator of D-2, is sent from Node-A 510 towards Node-B 520. Packet 541 is updated by node(s) 505 resulting in packet 542 with operations data including "A, N" (e.g., operations data related to traversed nodes). Node-B 520 receives packet 542 and typically captures and possibly adds its related operation data to packet 542 as it is being processed by a protocol layer. In one embodiment, this operations data includes, but is not limited to, timestamp(s), node identification values, service level agreement related information, packet count, sequence number, other operations (e.g., telemetry) data.

Packet 542 (with this additional operations data) is processed according to the reflective functionally of Your Discriminator D2. Accordingly, Node-B 520 performs local analytics processing of operations data related to packet 542, such as, but not limited to determining compliance with one or more requirements of a service level agreement and/or other determinations (e.g., jitter, delay, packet loss).

In response to these local analytics processing, Node-B 520 creates reply S-BFD Control packet 543 and includes one or more results (e.g., values, flags, diagnostic codes) such as an SLA-compliance flag or diagnostic code in an operations data field of packet 543. Packet 543 is forwarded towards initiator Node-A 510, that receives S-BFD Control packet 544 (e.g., same as packet 543 or possibly with some operations data added by a traversed node). Node-A 510 correspondingly uses the one or more received results, including, but not limited to, adjusting routing or forwarding of packets, increasing monitoring rates of certain path or nodes in network 500, communicating this information to other network node(s), and/or causing a modification to a configuration of one or more network nodes to adjust/improve the operation of the network or a component thereof.

Figure 5D:
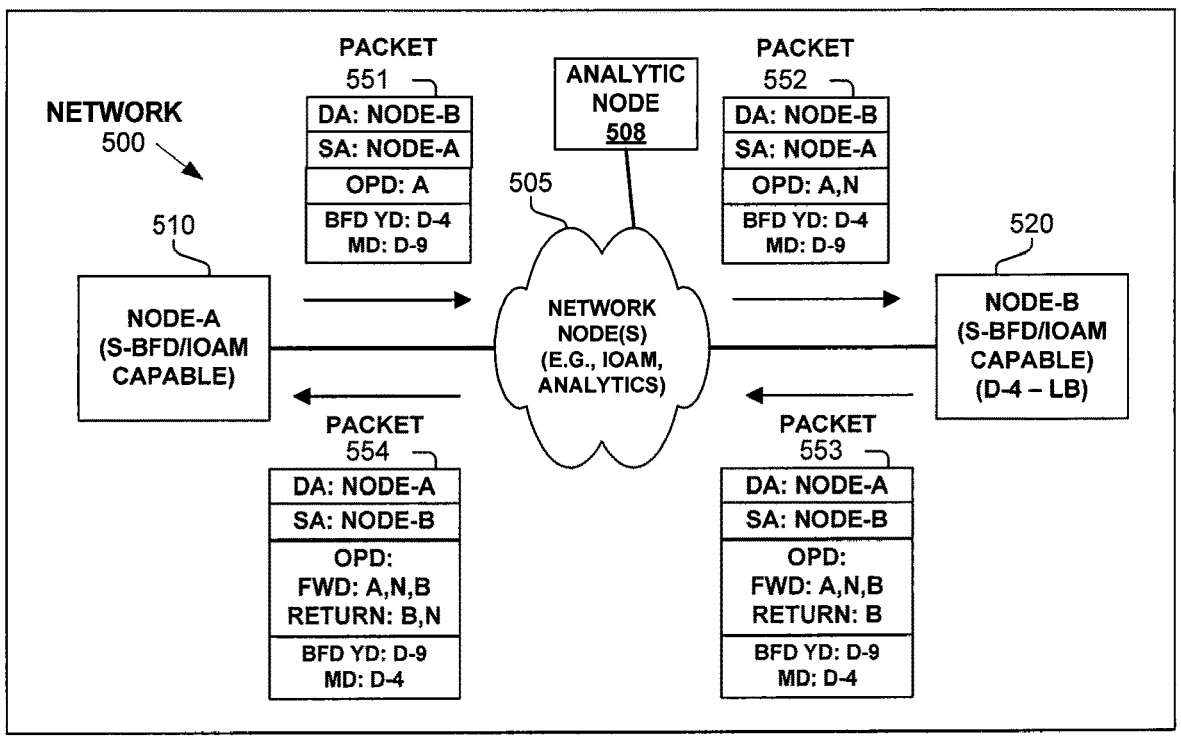
FIG. 5D illustrates a network operating according to one embodiment.

FIG. 5D illustrates network 500 operating according to one embodiment. As shown, initiator Node-A 510 creates S-BFD Control packet 551 that includes an operations data field and/or header that includes operations data (e.g., node identification, timestamp, and/or other operations data) labeled "A" related to Node-A 510. Packet 551, with Your Discriminator of D-4, is sent from Node-A 510 towards Node-B 520. Packet 551 is updated by node(s) 505 resulting in packet 552 with operations data including "A, N" (e.g., operations data related to traversed nodes). Node-B 520 receives packet 552 and typically captures and possibly adds its related operation data to packet 552 as it is being processed by a protocol layer. In one embodiment, this operations data includes, but is not limited to, timestamp(s), node identification values, service level agreement related information, packet count, sequence number, other operations (e.g., telemetry) data.

Packet 552 (with this additional operations data) is processed according to the reflective functionally of Your Discriminator D4. Accordingly, Node-B 520 performs loop-back analytics processing of operations data related to packet 552.

In one embodiment, this loopback analytics processing includes, but is not limited to, creating S-BFD Control packet 553 and including in an operations data field the operations data related to received packet 552 (e.g., forward path of "A,N,B") as well as reverse path operations data (e.g., return path of "B"). S-BFD Control packet 553 is sent towards initiator Node-A 510.

Packet 553 is forwarded towards initiator Node-A 510 through network node(s) 505, that update the operations data resulting in S-BFD Control packet 544 that is received by Node-A 510. In one embodiment and in response to the operations data collected in relation received S-BFD Control packet 544, Node-A 510 performs operations analytics (directly or by providing to an analytics server) producing one or more results. In one embodiment, Node-A 510 correspondingly uses the one or more results, including, but not limited to, adjusting routing or forwarding of packets, increasing monitoring rates of certain path or nodes in network 500, communicating this information to other network node(s), and/or causing a modification to a configuration of one or more network nodes to adjust/improve the operation of the network or a component thereof.

Figure 5E:
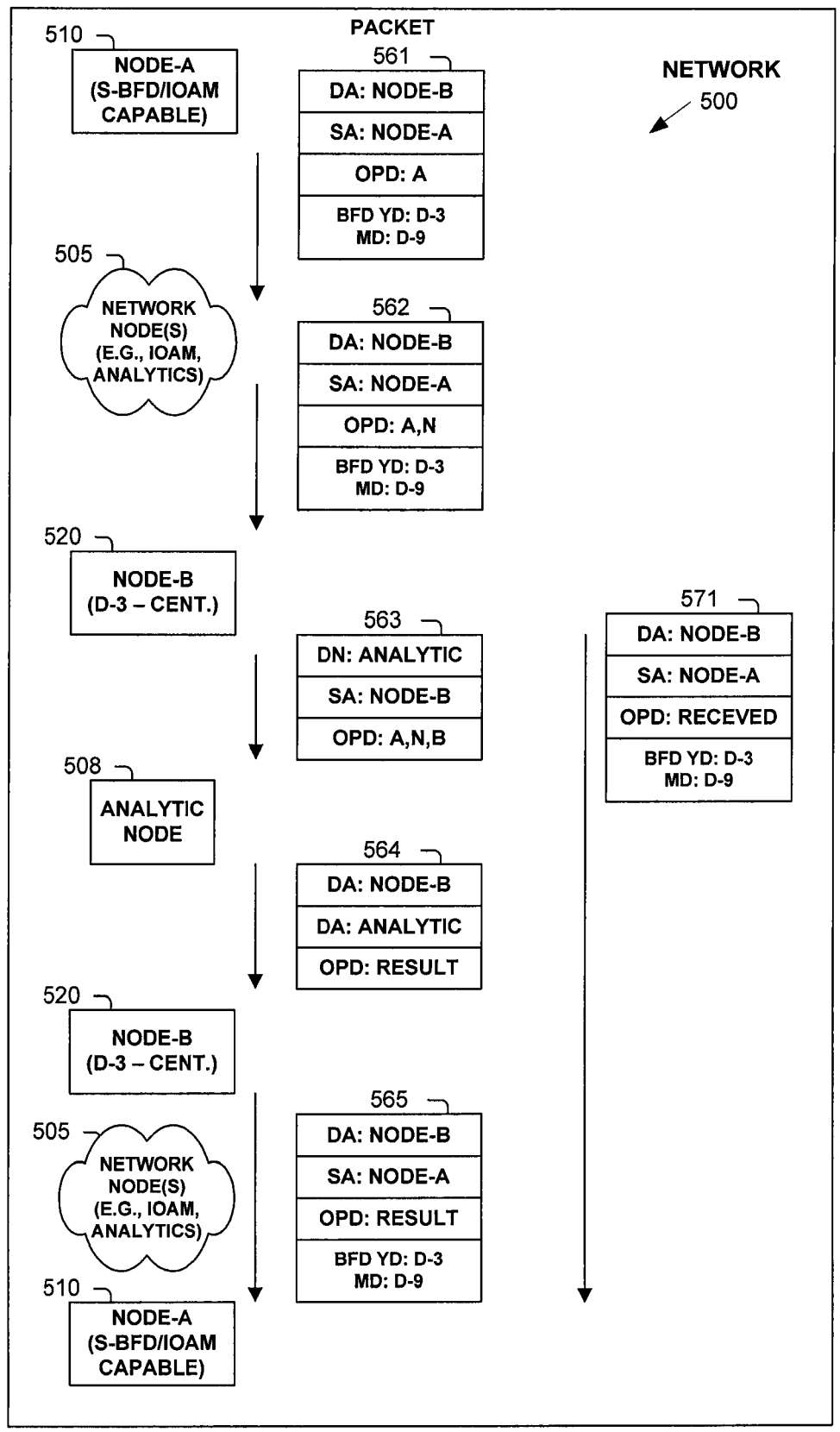
FIG. 5E illustrates a network operating according to one embodiment.

FIG. 5E illustrates network 500 (e.g., also shown in FIGS. 5A-D) operating according to one embodiment. In one embodiment, rather than locally performing analytics on acquired operations data (e.g., as shown in FIG. 5C), node B 520 will forward the received operations data to analytic node 508 to process and return one or more results.

As shown in FIG. 5E, initiator Node-A 510 creates S-BFD Control packet 561 that includes an operations data field and/or header that includes operations data (e.g., node identification, timestamp, and/or other operations data) labeled "A" related to Node-A 510. Packet 561, with Your Discriminator of D-3, is sent from Node-A 510 towards Node-B 520. Packet 561 is updated by node(s) 505 resulting in packet 562 with operations data including "A, N" (e.g., operations data related to traversed nodes). Node-B 520 receives packet 562 and typically captures and possibly adds its related operation data to packet 562 as it is being processed by a protocol layer. In one embodiment, this operations data includes, but is not limited to, timestamp(s), node identification values, service level agreement related information, packet count, sequence number, other operations (e.g., telemetry) data.

In accordance with the reflector processing identified by discriminator D-3, Node-B 520 creates and sends packet 563 (containing the acquired operations data) to analytic node 508 which performs analytics (e.g., operations) processing and then returns one or more results in packet 564 to Node-B 520. In one embodiment, analytic node 508 determines one or more results by performing analytics processing of operations data related to packet 563, such as, but not limited to determining compliance with one or more requirements of a service level agreement and/or other determinations (e.g., jitter, delay, packet loss). In one embodiment, Node-B 520 responds to received packet 562 by sending packet 571 to Node-A 510 to indicate that the operations data and processing request has been received, and possibly to expect a response packet after completion of the processing.

In response to receiving packet 564 with the result(s), Node-B 520 creates reply S-BFD Control packet 565 that includes one or more results (e.g., values, flags, diagnostic codes)) such as an SLA-compliance flag or diagnostic code in an operations data field. S-BFD Control packet 565 is forwarded through network 500 to Initiator Node-A 510, that receives S-BFD Control packet 565. Node-A 510 correspondingly uses the one or more received results, including, but not limited to, adjusting routing or forwarding of packets, increasing monitoring rates of certain path or nodes in network 500, communicating this information to other network node(s), and/or causing a modification to a configuration of one or more network nodes to adjust/improve the operation of the network or a component thereof.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method comprising:
receiving a particular Seamless Bidirectional Forwarding Detection (S-BFD) packet by a particular network node from another network node in a network, wherein the S-BFD packet includes a particular discriminator and particular operations data, with said received S-BFD packet including said particular operations data in an operations data field in a header of said received S-BFD packet; and
in response to identifying a particular reactive action of a plurality of different reactive actions based on the particular discriminator, the particular network node processing said particular S-BFD packet according to the particular reactive action;
wherein each of the plurality of different reactive actions is identifiable based on a different discriminator value; and
wherein the particular reactive action includes: determining a result based on processing of said particular operations data, and the particular network node sending into the network a response packet including the result.

2. The method of claim 1, wherein said particular operations data is stored in an In-situ Operations, Administration, Maintenance (IOAM) Type-Length-Value (TLV) of the particular S-BFD packet.

3. The method of claim 1, wherein the response packet is a S-BFD Control packet.

4. The method of claim 3, wherein the result includes an indication reflective of conformance with a requirement of a service level agreement (SLA).

5. The method of claim 4, wherein the requirement of the SLA includes a packet loss requirement or packet delay requirement.

6. The method of claim 3, where the response packet is sent to an Initiator of the particular S-BFD packet.

7. The method of claim 1, wherein said determining the result based on processing of said particular operations data is performed by the particular network node.

8. The method of claim 7, wherein said determining the result based on processing of said particular operations data includes communicating said particular operations data to an analytics server and receiving the result from the analytics server.

9. A method comprising:
receiving a particular Seamless Bidirectional Forwarding Detection (S-BFD) packet by a particular network node from another network node in a network, wherein the S-BFD packet includes a particular discriminator and particular operations data; and
in response to identifying a particular reactive action of a plurality of different reactive actions based on the particular discriminator, the particular network node processing said particular S-BFD packet according to the particular reactive action;
wherein each of the plurality of different reactive actions is identifiable based on a different discriminator value; and
wherein the particular reactive action includes the particular network node sending into the network a response packet including said particular operations data.

10. The method of claim 9, wherein the response packet is a S-BFD Control packet sent to an Initiator of the particular S-BFD packet.

11. The method of claim 9, wherein said particular operations data includes operations data obtained from a plurality of network nodes in the network.

12. The method of claim 9, wherein said particular operations data is stored in an In-situ Operations, Administration, Maintenance (IOAM) Type-Length-Value (TLV) of the particular S-BFD packet.

13. A method comprising:
receiving a particular Seamless Bidirectional Forwarding Detection (S-BFD) packet by a particular network node from another network node in a network, wherein the S-BFD packet includes a particular discriminator and particular operations data; and
in response to identifying a particular reactive action of a plurality of different reactive actions based on the particular discriminator, the particular network node processing said particular S-BFD packet according to the particular reactive action;
wherein each of the plurality of different reactive actions is identifiable based on a different discriminator value;
wherein the plurality of different reactive actions includes a path liveliness action associated with a second discriminator; and
wherein the method includes in response to receiving a second S-BFD Control packet including the second discriminator, the particular network node sending a third S-BFD Control packet to an initiator network node identified in the second S-BFD Control packet.

14. A method, comprising:
receiving a particular Seamless Bidirectional Forwarding Detection (S-BFD) Control packet by a particular network node in a network with the S-BFD packet being originated by an initiator network node, wherein the particular S-BFD packet includes a particular BFD Control packet, and includes particular operations data in a particular In-situ Operations, Administration, Maintenance (IOAM) field in a header of the particular S-BFD packet, with the particular BFD Control packet including a particular discriminator in the Your Discriminator field and an initiator discriminator in the My Discriminator field;
in response to identifying a particular reactive action of a plurality of different reactive actions based on the particular discriminator, the particular network node operations processing said particular S-BFD packet according to the particular reactive action;
wherein each of the plurality of different reactive actions is identifiable based on a different discriminator value; and
wherein said operations processing said particular S-BFD packet includes sending a specific S-BFD Control packet to the initiator network node, wherein the specific S-BFD packet includes a specific BFD Control packet and includes a specific IOAM data field in a header of the specific S-BFD packet, with the specific BFD Control packet including the initiator discriminator in the Your Discriminator field and the particular discriminator in the My Discriminator field.

15. The method of claim 14, wherein said operations processing said particular S-BFD packet includes performing network analytics processing based on said particular operations data generating a result and including said result in the specific IOAM data field.

16. The method of claim 14, wherein said operations processing said particular S-BFD packet includes: communicating said particular operations data to an analytics server, receiving a result from the analytics server, and including said result in the specific IOAM data field.

17. The method of claim 16, wherein said operations processing said particular S-BFD packet includes sending a second S-BFD Control packet to the initiator network node, with the second S-BFD Control packet including an indication that operations processing is being performed.

18. The method of claim 14, wherein said operations processing said particular S-BFD packet includes populating a specific IOAM Type-Length-Value (TLV) in the specific IOAM data field with said particular operations data.

19. A particular network node in a network, comprising:
one or more processing elements;
memory;
one or more interfaces that communicate packets with the network; and
wherein the particular network node performs operations including:
receiving a particular Seamless Bidirectional Forwarding Detection (S-BFD) Control packet on one of said interfaces with the S-BFD packet being originated by an initiator network node in the network, wherein the particular S-BFD packet includes a particular BFD Control packet and particular operations data in a particular In-situ Operations, Administration, Maintenance (IOAM) field a header of the particular S-BFD packet, with the particular BFD Control packet including a particular discriminator in the Your Discriminator field and an initiator discriminator in the My Discriminator field;
in response to identifying a particular reactive action of a plurality of different reactive actions based on the particular discriminator, the particular network node operations processing said particular S-BFD packet according to the particular reactive action;
wherein each of the plurality of different reactive actions is identifiable based on a different discriminator value; and
wherein said operations processing said particular S-BFD packet includes sending from one of said interfaces a specific S-BFD Control packet to the initiator network node, wherein the specific S-BFD packet includes a specific BFD Control packet and a specific IOAM field in a header of the specific S-BFD packet, with the specific BFD Control packet including the initiator discriminator in the Your Discriminator field and the particular discriminator in the My Discriminator field.

20. The particular network node claim 19, wherein each of the particular IOAM field and the specific IOAM field includes a Type-Length-Value (TLV).

* * * * *

UNITED STATES PATENT AND TRADEMARK OFFICE
CERTIFICATE OF CORRECTION

PATENT NO.         : 10,972,381 B2
APPLICATION NO.    : 16/392299
DATED              : April 6, 2021
INVENTOR(S)        : Pignataro et al.

Page 1 of 1

It is certified that error appears in the above-identified patent and that said Letters Patent is hereby corrected as shown below:

In the Claims

Column 14, Claim 19, Line 36, "field a header" should read -- field in a header --.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*